United States Patent Office 3,729,483
Patented Apr. 24, 1973

3,729,483
PREPARATION OF N-VINYL CARBAZOLE
BY TRANSVINYLATION
Richard E. Wolf, Prospect Heights, and Susan B. Gorman, Des Plaines, Ill., assignors to DeSoto, Inc., Des Plaines, Ill.
No Drawing. Filed June 4, 1971, Ser. No. 150,236
Int. Cl. C07d 27/68
U.S. Cl. 260—315                    9 Claims

ABSTRACT OF THE DISCLOSURE

N-vinyl carbazole is produced by a transvinylation reaction of carbazole with an alkyl or aryl vinyl ether in the presence of mercuric salt such as mercuric acetate or mercuric oxide, the reaction being carried out in the presence of an acidic catalyst constituted by any relatively strong acid.

---

The present invention relates to the production of N-vinyl carbazole by a process involving transvinylation. N-vinyl carbazole is a known vinyl monomer which may be polymerized using conventional polymerization procedures to form poly(N-vinyl carbazole) which is an organic solvent soluble resin useful for depositing photoconductive coatings and films.

In this invention, carbazole is transvinylated with an alkyl or aryl vinyl ether in the presence of mercuric salt or oxide and an acidic catalyst. Attempts to transvinylate N-vinyl carbazole have previously been made, but the main products of such prior efforts have been either alpha-alkoxy-ethyl carbazoles or low molecular weight polymers of N-vinyl carbazoles which possess poor photoconductive characteristics. Surprisingly, the present process provides N-vinyl carbazole monomer in good yield, which can be easily purified and then polymerized to provide resins of good photoconductive quality.

The reaction under consideration can be represented as follows:

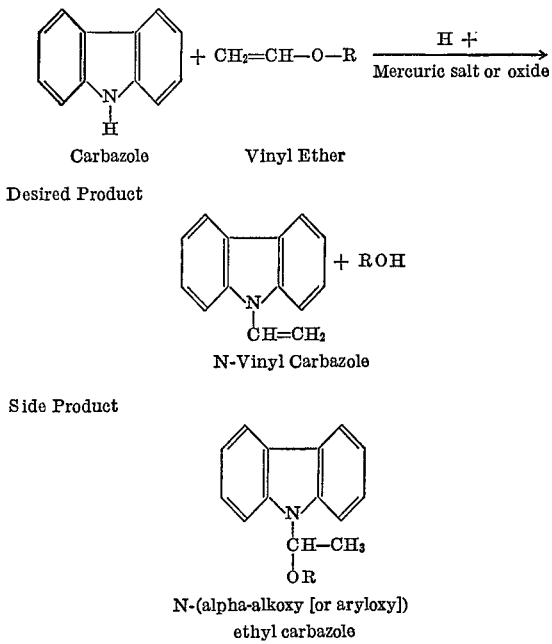

The R group may be any monovalent hydrocarbon radical free of reactive unsaturation. Preferably, the R group may contain from 1–22 carbon atoms, more preferably from 2–8 carbon atoms. The R group is most preferably an alkyl group of 1–4 carbon atoms.

The catalyst combination determines the ratio of desired product to side product and it also determines the rate of reaction.

First, any mercuric salt with an organic carboxylic acid may be used, especially the monocarboxylic acids, mercuric acetate being particularly preferred. Mercuric formate, propionate, stearate, succinate, and versatate will further illustrate the salts which are useful. Mercuric oxide is also useful. On the other hand, mercuric chloride is inoperative. Similarly, zinc acetate and copper acetate do not yield the desired product.

The proportion of mercuric salt is also important. In the absence of the salt, the product of reaction does not include any significant N-vinyl carbazole. At 0.05 mole percent of mercuric salt, based on the carbazole reactant, a significant proportion of N-vinyl carbazole is produced. Above about 0.2 mole percent of mercuric salt, the proportion of carbazole converted to N-vinyl carbazole exceeds 50% of the product mixture and more mercuric salt further increases the proportion of N-vinyl carbazole in the crude product mixture to 80% at 1.0 mole percent. Larger amounts of mercuric salt can be used, but little further benefit is obtained so this, while possible, is not economic.

The acid used to provide the desired hydrogen ion concentration need merely be an acid of reasonable strength, and any acid, organic or inorganic, which is stronger than acetic acid may be used. These are illustrated by sulfuric, hydrochloric, oxalic or p-toluene sulfonic acids. The last named acid is preferred and will be used as illustrative.

While the acid is necessary, its proportion of use should also be taken into account; the more acid, the faster the reaction. On the other hand, too much acid reduces the yield of desired product. With strong acids, such as p-toluene sulfonic acid, at least about 0.020 mole percent is needed, based on the carbazole, to provide the desired reaction, but at least about 0.050 mole percent is needed for a reasonable reaction rate. In most preferred practice, the strong acid is used in an amount of from 0.060–0.10 mole percent.

The vinyl ether which is selected will depend primarily on price and convenience of boiling point since it is desired to separate the products at the completion of the reaction. However, any alkyl or aryl vinyl ether may be used such as methyl vinyl ether, ethyl vinyl ether, n-butyl vinyl ether, isobutyl vinyl ether, phenyl vinyl ether, and the like. The reaction is carried out in the liquid phase, organic solvents being present or absent as desired. The reaction is facilitated by heat, temperatures of from 20–150° C. being suitable, preferably from 50–120° C. When the reaction is completed (usually noted when the carbazole reactant has dissolved in the vinyl ether) the acid catalyst is neutralized and the product is distilled to remove unreacted vinyl ether and 1,1-dialkoxy ethane (a reaction product formed from the liberated alcohol and excess vinyl ether).

The proportion of vinyl ether is of consequence. Generally, a molar excess of the vinyl ether is employed with the unreacted vinyl ether being removed after the reaction is over. The preferred vinyl ethers are lower alkyl vinyl ethers in which the alkyl group contains from 1–4 carbon atoms.

The product can be purified by distillation and recrystallization (typically from methanol).

The invention is illustrated in the examples which follow.

EXAMPLE 1

In a 5 liter, 3 necked flask equipped with stirrer and condenser were placed 870 grams (5 mols) of 96% carbazole, 2000 grams (4 eq., 20 mols) of isobutyl vinyl ether, and 10.4 grams (1.25% based on weight of carbazole or .65 mol percent) of mercuric acetate. The resulting slurry was stirred and a solution of 0.585 gram of p-toluene sulfonic acid monohydrate in 41 grams of tetrahydrofuran was added. The mixture was stirred and heated to reflux and was held at reflux until solution had occurred (105 minutes). Heating was stopped and 25 grams of anhydrous sodium carbonate were added to quench the catalyst. The mixture was cooled and filtered and another 25 grams of sodium carbonate added. This mixture was distilled at atmospheric pressure to remove unreacted vinyl ether. The mixture was distilled under vacuum (3 mm. Hg) to remove 1,1-diisobutoxy ethane and crude product. The crude product was distilled at 139–142°/3 mm. and solidified. The distillate was recrystallized from methanol to give 544 grams of N-vinyl carbazole (57% yield).

EXAMPLE 2

Following the procedure of Example 1, using carbazole (520 grams, 3 mol), isobutyl vinyl ether (1200 grams, 4 eq.), mercuric oxide (10 grams, 2.00%, 1.55 mol percent) and p-toluene sulfonic acid monohydrate (0.30 gram in 20 grams of tetrahydrofuran). After distillation, the product was washed with pentane to give 337 grams of N-vinyl carbazole (58% yield).

EXAMPLE 3

Following the procedure of Example 1, but substituting phenyl vinyl ether for the isobutyl vinyl ether, the reaction was run. The reaction proceeded at a slower rate and gave a lower product yield (10% yield in 4 hours' reaction time).

The invention is defined in the claims which follow.

We claim:

1. A method for the production of N-vinyl carbazole comprising transvinylating carbazole with an alkyl or aryl vinyl ether by a liquid phase reaction at a temperature of about 20–150° C. in the presence of at least 0.05 mole percent of a mercuric salt with an organic carboxylic acid or mercuric oxide and at least about 0.020 mole percent of an acid which is stronger than acetic acid, said proportions being based on the carbazole reactant.

2. A method as recited in claim 1 in which said reaction is carried out at a temperature of about 50–120° C.

3. A method as recited in claim 1 in which said vinyl ether is used in molar excess with respect to said carbazole.

4. A method as recited in claim 3 in which said vinyl ether is a lower alkyl vinyl ether containing from 1–4 carbon atoms in the alkyl group.

5. A method as recited in claim 1 in which said strong acid is used in an amount of from 0.060–0.10 mole percent.

6. A method as recited in claim 5 in which said strong acid is p-toluene sulfonic acid.

7. A method as recited in claim 1 in which said strong acid is used in an amount of at least about 0.050 mole percent and said mercuric salt or oxide is used in an amount of from 0.2 mole percent to about 1.0 mole percent.

8. A method as recited in claim 1 in which said mercuric salt is mercuric acetate.

9. A method as recited in claim 1 in which said mercuric salt is a salt of a monocarboxylic acid.

References Cited

UNITED STATES PATENTS

| | | | |
|---|---|---|---|
| 2,426,465 | 8/1947 | Miller et al. | 260—315 |
| 2,472,085 | 6/1949 | Beller et al. | 260—315 |
| 2,984,687 | 5/1961 | Esmay et al. | 260—577 |
| 3,470,230 | 9/1969 | Hirsch et al. | 260—465.3 |
| 3,564,007 | 2/1971 | Stern et al. | 260—315 |
| 3,627,524 | 12/1971 | Kinjo et al. | 96—1.5 |

HENRY R. JILES, Primary Examiner

G. T. TODD, Assistant Examiner